Jan. 23, 1940.   A. R. WILLIAMS   2,188,293
AUTOMATIC VEHICLE CONTROL SYSTEM
Filed April 29, 1937   8 Sheets-Sheet 1

Inventor
Allison R. Williams
By [signature]
Attorneys

Fig. 4

Jan. 23, 1940.  A. R. WILLIAMS  2,188,293
AUTOMATIC VEHICLE CONTROL SYSTEM
Filed April 29, 1937   8 Sheets-Sheet 6

Inventor
Allison R. Williams

By [signature], Attorneys

Jan. 23, 1940.  A. R. WILLIAMS  2,188,293
AUTOMATIC VEHICLE CONTROL SYSTEM
Filed April 29, 1937  8 Sheets-Sheet 8

Inventor
Allison R. Williams
By
Dodge and Sons
Attorneys

Patented Jan. 23, 1940

2,188,293

UNITED STATES PATENT OFFICE 2,188,293

AUTOMATIC VEHICLE CONTROL SYSTEM

Allison R. Williams, Yazoo City, Miss.

Application April 29, 1937, Serial No. 139,816

27 Claims. (Cl. 250—2)

This invention relates to the art of vehicle control and includes control of all types of vehicles, particularly those which are dirigible such as automobiles, ships, and aircraft. More particularly, the invention concerns the automatic control of vehicles so that their control mechanism is automatically responsive to dangerous conditions without requiring a physical reaction on the part of the vehicle operator. The invention will be understood more clearly if the description of the mechanism to be used is prefaced by a discussion of a few of the more common situations to which it may be applied.

Automobiles

The control of automotive vehicles on highways and in cities where congested traffic is encountered is dependent upon two things; first, the physical reaction of the driver of the vehicle to various stimuli arising in the course of operation, and second, the mechanical devices incorporated in the vehicle and under the driver's control. The physical reactions of the driver cannot be standardized because they are dependent upon the health, state of mind, and general psychological make-up of the individual. The dexterity with which instinctive manual control is carried out, and the speed with which the driver reacts to an emergency are wholly beyond the scope of either a mechanical robot or of any automatic control device. The mechanical controls of the vehicle itself are capable of rigid standardization and can be relied upon to operate efficiently at all times, provided they are properly actuated by the driver.

It is the purpose of this invention to eliminate the human element as much as possible in the control of dirigible vehicles and particularly automotive vehicles on highways and in congested traffic.

Highway operation

When a line of vehicles is moving along a highway at a high rate of speed, experience has shown that it is advisable for drivers to maintain a separation between vehicles along the line to conform approximately to their speed. In other words, the faster the line of vehicles is moving, the greater should be the separation between vehicles. This separation is based upon the knowledge of the individual driver gained through experience, that to sense a variation in control of the vehicle immediately ahead of him in the line, to weigh the situation, and to react physically in controlling his own vehicle requires a certain period of time which is determined by the distance between vehicles.

The first object of this invention is to maintain the separation of vehicles moving in a line along a highway at a proper minimum distance automatically and entirely independently of the reactions of the driver.

Cross traffic

If one or more vehicles are moving along a thoroughfare which is intersected periodically by cross roads, the usual means of insuring the movement of cross traffic at these intersections is stop signals. The efficiency of such routing of cross traffic depends upon the ability of the drivers of the vehicles along both the thoroughfare and the cross road, to control properly their vehicles in response to the indications of the stop signals, thereby avoiding over-running the intersection with consequent collisions or other accidents. Many dangerous situations can arise unders such circumstances. One common situation is that of collision between vehicles in a line of traffic, due to the driver of the leading vehicle suddenly attempting to stop when almost upon the intersection, having failed to recognize timely that the stop signal was set against him.

It is, therefore, another object of this invention to eliminate the possibility of a vehicle over-running an intersection against a stop signal. This is accomplished by providing automatic means for controlling the vehicle independently of the driver, and compelling it to conform with the traffic signal set.

It is a further object of this invention to provide automatic means for preventing collision between vehicles proceeding in a line, by stopping said vehicles in succession to comply with the condition of motion of the leading vehicle.

Curves

In a line of vehicles moving at high speed along a thoroughfare and approaching a curve, it is generally found difficult for following cars to avoid skidding or overturning when the leading vehicle slows down in order to take the turn sharply. The following vehicles, especially if the drivers are not aware of the existence of the curve, may collide with one another in attempting to slow down to conform to the motion of the leading vehicle. Some of the following vehicles may even leave the lane of traffic and attempt to circle those vehicles immediately ahead, resulting possibly in collision around the turn with vehicles coming from the other direction.

It is a further purpose of this invention to prevent speeding vehicles from approaching a curve without slowing down, and to eliminate the possibility of following vehicles colliding with those ahead, also to prevent vehicles from leaving the traffic lane and circling vehicles ahead as they are making the turn.

Parking

The system is of value in preventing automotive vehicles from parking too close together, and in preventing accidents when vehicles attempt to move into parking spaces behind other vehicles at too high a speed. Automatic adjustment of the effectiveness of the control mechanism may make it possible for a vehicle to move into parking spaces slowly up to a predetermined distance behind a forward vehicle, but to prevent too close spacing. Such control also prevents a vehicle from dashing into a parking space at too rapid a rate.

Aircraft

The invention also has application to aircraft and is capable of preventing collisions between aircraft and elevated objects along the line of flight, or between one aircraft and another. Frequent accidents have occurred, under conditions of poor visibility, by reason of aircraft striking mountains, towers or other similar objects. The present invention contemplates automatic control of aircraft in response to signals transmitted from stationary objects and received on the craft, or from collision by signals transmitted from another craft.

Marine craft

A further application of the invention is found in marine craft which may be controlled automatically so as to avoid accidents in fog or heavy weather or because of incompetence or lack of attention on the part of operators of such craft. Each craft may be equipped with both sending and receiving means, and shore stations may be equipped with sending means to provide automatic control of the craft under dangerous conditions.

Rail vehicles

In rail vehicles it is desirable to have means carried by the vehicles themselves to prevent rear-end collisions. While it has been proposed in the prior art to cause a brake application on a following train approaching a leading train too closely, it has never, so far as I am aware, been proposed to control, by means independent of the track rails, the interval of separation between two such vehicles in accordance with conditions of rest or motion of one of the vehicles. It has never been proposed to take into account the velocity and the acceleration or deceleration of one vehicle with respect to the other, or to take into account the fact that the safe interval may vary in accordance with varying conditions and to provide automatically for all such variations.

It is, therefore, a further object of this invention to provide automatic control means for said vehicles, and to vary the response or effectiveness of the control means automatically in response to changing conditions.

Control energy

The control energy, according to this invention, may consist of polarized light, supersonic sound vibrations, special colors or combinations of color, infra-red rays, and other forms of wave motion of a character such that the receiving devices will only be actuated upon receipt of energy from the particular source relied upon for control purposes. While various forms of control energy may be found suitable, it is at present preferred to use either polarized light or supersonic vibrations. These types of energy are simple to produce and can be controlled readily without creating a nuisance or any form of hazard to persons or to existing apparatus not subject to control.

The method and apparatus whereby the safe control of vehicles of various types is accomplished will be understood more fully from a reading of the following description in connection with the accompanying drawings in which.

The method of vehicle control which forms the basis of the present invention consists primarily in providing each vehicle with automatic controlling means responsive under unsafe conditions, and particularly with such means in the form of one or more receiving or pick-up devices made responsive to some form of control energy. The control energy may be supplied either from a transmitter carried by another vehicle or from a stationary source, the important and outstanding characteristic being that the vehicle is controlled automatically under unsafe conditions without the necessity of response on the part of the operator of the vehicle.

Numerous modifications of the inventive idea may be utilized and for the sake of illustration, a few typical arrangements will be described in detail.

When the system is applied to automotive vehicles, it will generally be found preferable to provide each vehicle with at least one transmitter and one receiver. In this way, the vehicle control is responsive to control energy sent out by the transmitter of another vehicle or from a stationary source, thus making for the utmost in safety. While, as indicated above, the control energy may take various forms, it will be assumed in the present description that it consists of wave motion either in the form of plane polarized light or supersonic sound vibrations, that is, sound vibrations which are beyond the range of audibility to the human ear in the sound spectrum.

In the case of automotive vehicles, it is preferred to place a receiving device at or near the front of the vehicle or at least facing forwardly, and a transmitting device at or near the rear of the vehicle or facing rearwardly thereon. In this way, when the vehicles are proceeding in line, this being the condition under which the present invention finds its greatest application, the receiving device of each vehicle will receive energy from the transmitter on the vehicle ahead. However, it may often be desirable to equip vehicles with more than one transmitter, or more than one receiver, or more than one of each of them. One or more transmitters may, for example, be so placed on a vehicle as to transmit control energy laterally in directions approximately at right angles to the longitudinal axis of the vehicle, to thereby exercise control on vehicles approaching a vehicle in an intersection. Similarly a transmitter may be disposed to direct control energy forwardly of the vehicle to prevent head-on collisions with vehicles traveling in the opposite direction. Other similar arrangements may be made to meet special conditions.

In practical use it will also be essential to provide means for varying the sensitiveness of the energy receiving means under varying conditions, and also to vary the effectiveness of the control energy transmitter.

For example, the transmitter at the rear of a vehicle traveling at high speed need not be as effective as it is when the vehicle is standing still or moving slowly. Conversely the receiver at the front of a vehicle moving at high speed should be more sensitive than it is when the vehicle is standing still or moving slowly. In other words, it is desirable and essential that both the transmitting means and the receiving means be controlled as to effectiveness in accordance with changing conditions.

While the controlling means may take various forms, only a few of which are described and illustrated in the present application, it will first be described as embodied in a simple system which is responsive to wave motion in the form of plane polarized light.

Figure 3:
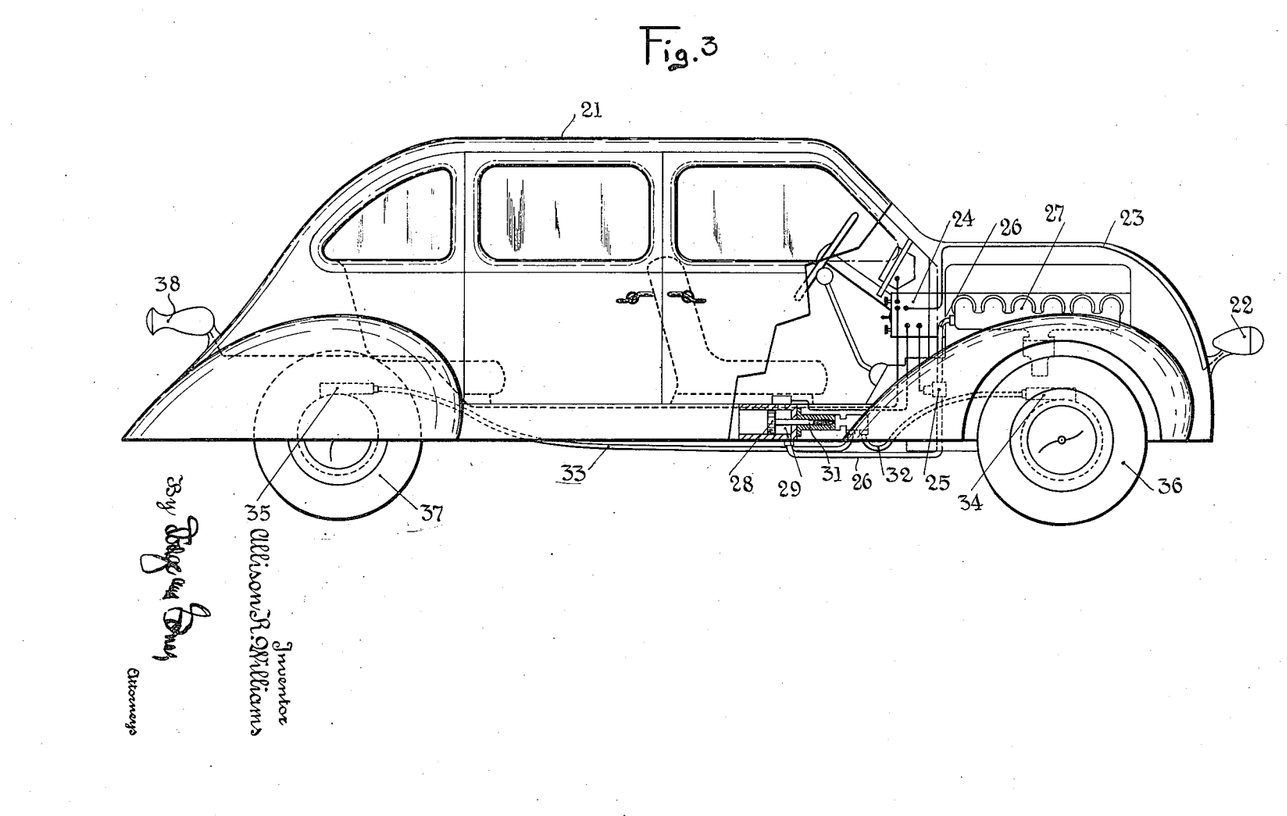
Fig. 3 is a side elevation of a typical passenger-carrying automotive vehicle with parts broken away to show one form of automatic control mechanism which may be embodied therein, according to the present invention.

Referring now to Fig. 3 of the drawings, the reference character 21 designates an automotive vehicle of the type at present in vogue and having the usual propelling and braking equipment. Disposed at or near the front of this vehicle is a receiving device 22 responsive to vibrations of plane polarized light and connected through a control cable 23 to a control box 24 located on the dash of the vehicle. In the system here illustrated, the light picked up by the receiver 22 controls a valve 25 connected in a pipe 26 leading from the intake manifold 27 of the engine to a cylinder 29 containing a vacuum operated piston 28, and carried underneath the floor boards of the vehicle. The piston 28 actuates the master plunger 31 of the hydraulic braking system. Opening of the valve 25 causes movement of the piston 28 toward the right in Fig. 3 and results in the braking fluid being compressed by the master plunger 31, and transmitting pressure through the lines 32 and 33 to the brake operators 34 and 35 associated with the wheels 36 and 37, respectively, of the vehicle. Closing of the valve 25 causes release of the brakes and restoration of the piston 28 to its normal position of rest.

It will be clear that variations in the intensity of the light striking the receiver 22 will cause variations in the position of the brake operating means. The transmitting device designated 38 is located at or near the rear of the vehicle and is connected up with the control mechanism in such manner that the intensity of the plane polarized light transmitted will vary in accordance with the rate of movement of the vehicle, or in accordance with changes in that rate of movement. Likewise the receiver 22 is arranged so that its sensitiveness is varied in accordance with changing conditions. While the control system has been illustrated as being applied to the braking system of the vehicle, it will be understood that it may also control the clutch and accelerator, or either of these, in combination with the braking mechanism. The primary purpose of the device is to provide automatic means for controlling vehicles regardless of what the particular controlling mechanism relied on may consist of.

Figure 4:
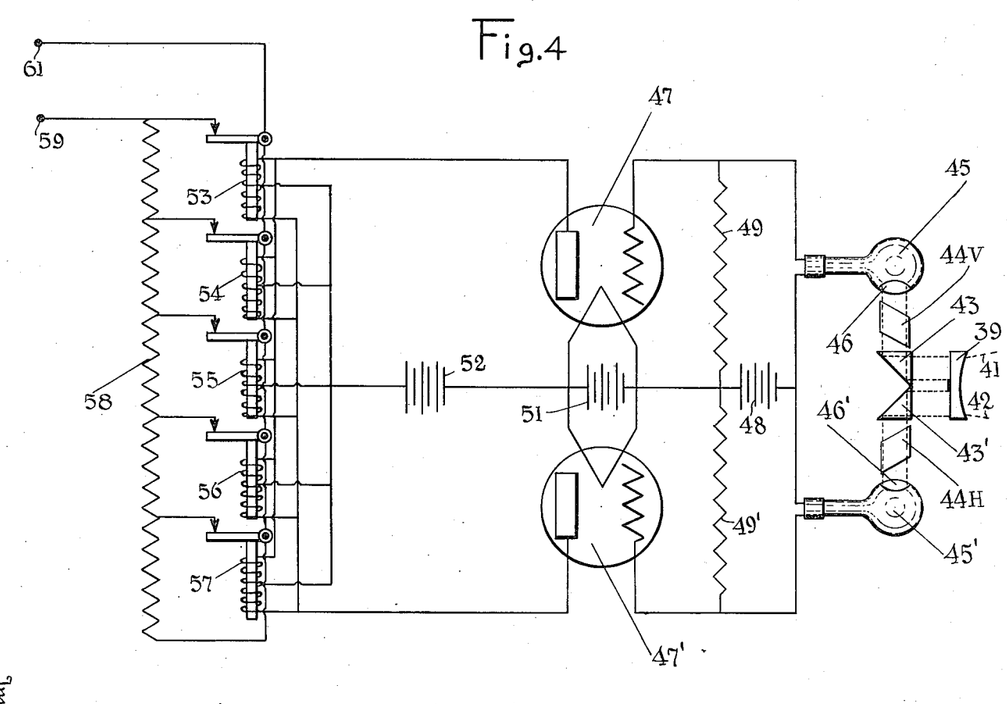
Fig. 4 is a circuit wiring diagram of one form of receiving system for exercising automatic control in accordance with the present invention.

Before describing in detail the mechanism provided on the vehicle for varying the intensity of the control energy transmitted, and the mechanism for varying the sensitiveness of the receiver, the circuits associated with the receiving device 22 will be described in connection with the circuit diagram shown in Fig. 4.

*Receiver*

Carried within any suitable form of housing (see Fig. 8) for the receiver 22, is a concave lens 39 adapted to receive and concentrate a beam of plane polarized light, here indicated as being polarized in a vertical plane defined by the lines 41 and 42. In rear of the lens 39 are two total reflecting prisms 43 and 43' adapted to deflect the light beams through polarizing screens 44, and onto photoelectric cells 45, 45' associated with a circuit for operating the braking mechanism. Two opposed systems are utilized in order to prevent the mechanism from responding to light beams which are not polarized. Inasmuch as the parts of the two circuits are duplicated, except that the planes of polarization of the polarizing screens are at right angles to each other, one on either side, a description of one side will be sufficient, the corresponding parts on the other side being indicated by the same reference characters primed.

For example, the prism 43 receives light from the lens 39 and deflects it at right angles onto a polarizing screen or Nicol prism 44V, (V indicates vertical plane polarization) and thence onto the aperture 46 of photoelectric cell 45. The photoelectric cell 45 is connected in the grid circuit of a vacuum tube 47 having the usual three elements, the grid circuit being supplied with current from a battery 48 through a resistance 49. A common filament battery 51 supplies the filaments of both tubes, while a plate battery 52 common to the plate circuits of both tubes furnishes current to a plurality of parallel-connected split circuit relays 53, 54, 55, 56 and 57. Inasmuch as the details of the vacuum tube circuits are not essential to an understanding of the present invention, it will be sufficient to state that when a beam of light strikes one of the cells 45 it causes a decrease in the resistance of that cell, and causes a rise in current in the grid circuit of the tube 47, and hence an increase in the voltage drop through the resistance 49 which is shunted across the grid circuit of the tube. The increase in grid voltage of the tube causes a rise in the plate current and the amount of this rise is approximately proportional to the intensity of the light entering the photoelectric cell.

The tubes are arranged to actuate the relays so as to short-circuit portions of a resistance 58. The resistance 58 is controlled by the relays so that the amount of resistance in circuit with the terminals 59, 61 varies with the amount of control energy striking the lens 39. When the energy received is insufficient to actuate any of the relays, all of the resistance 58 is shunted out of the circuit between the terminals 59 and 61. Progressive increases in energy received will cause sections of the resistance to be cut in, as the relays are energized. The number of relays energized, of course, increases with increases in plate current. The control circuit for the valve 25 on the intake manifold (Fig. 3) is connected to terminals 59 and 61. When the plate current of the tubes 47 increases in response to increases in the intensity of the light striking the lens 39, portions of resistance 58 are cut in, so that the amount of the resistance included in circuit with the terminals increases as the plate current of the tubes increases. It is, therefore, apparent that the brakes on the vehicle may be applied with a force which is proportional to the amount of light picked up by the receiver 22.

As indicated above, the receiver comprises two opposed systems for receiving polarized light. The purpose of this opposing circuit is to prevent the system from being operated by any source of light which is not polarized. For instance, if a beam of unpolarized light passes through the lens 39 it will be picked up by both the prisms 43 and 43', transmitted through the vertical polarizing screen 44V and through the horizontal polarizing screen 44H. Hence this light will strike both of the photoelectric cells 45 and 45', and will cause a voltage drop across the grids of both of the vacuum tubes 47 and 47', causing a resultant zero flux to pass through the solenoids of the relays 53 to 57. Consequently, there will be no operation of the brakes of the vehicle by the admission of unpolarized light to the receiver.

Figures 6, 8, 9:
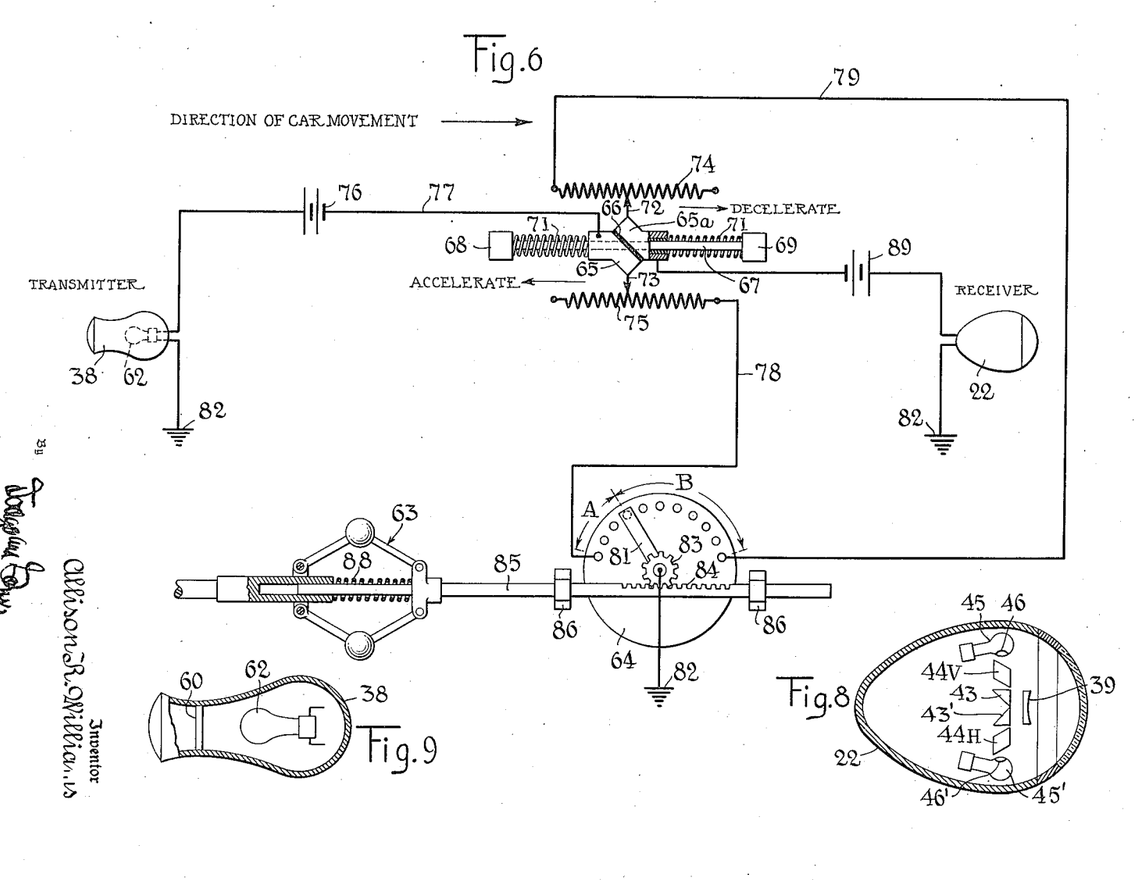
Fig. 6 is a diagrammatic view of one form of energy transmitting and receiving means, and a unitary control device for adjusting those means in response to changes in the character of vehicle movement.
Fig. 8 is a sectional view of a typical receiver or wave energy sensitive device suitable for mounting on a vehicle.
Fig. 9 is a sectional view of a typical control energy transmitter suitable for mounting on a vehicle.

As indicated above, it is essential that some means for transmitting control energy be provided for actuating the receivers on the vehicles. As also indicated above the transmitting means may be either stationary or movable. In describing the transmitter, it will be first assumed that it is mounted on an automotive vehicle constructed and arranged to vary the intensity of the light transmitted in accordance with the rate of movement of the vehicle carrying the transmitted, or in accordance with some function of that movement. As indicated above, it is essential that the sensitivity of the receiver be varied in response to changes in the rate of vehicle movement. Since it is readily possible to combine the control functions of the receiver and transmitter, the mechanism illustrated in Fig. 6 is so designed. It is to be understood, however, that should it be found desirable, the control of the transmitter may be separate and distinct from that of the receiver.

*The transmitter*

One form of mechanism for transmitting polarized light of intensity which varies in accordance with the state of rest or movement of the vehicle, and combined with it a receiver which has its sensitivity varied automatically, is illustrated diagrammatically in Fig. 6.

Referring to Fig. 6 of the drawings, the reference character 38 designates a transmitter comprising a housing having mounted therein a lamp 62 adapted to send out rays through a polarizing screen 60. In practice, the housing of the transmitter may assume various forms and any suitable type of polarizing means may be adopted. It is desirable, however, that simplicity of structure and ruggedness be given primary considerations. The details of the transmitter are shown in Fig. 9. The receiver, 22, the circuits of which have been shown in Fig. 4, is illustrated in detail in Fig. 8.

Associated with the transmitter 38 and the receiver 22, as indicated in Fig. 6, is an inertia device for automatically controlling the resistance in circuit with the two devices. Also associated with the mechanism is a centrifugal device 63 for controlling a rheostat 64 in circuit with both of said devices.

The inertia device is provided to prevent too sudden changes in the effectiveness of both the transmitter and the receiver. It consists of a mass made up of two sections 65 and 65a insulated from one another as at 66. The mass is movable along a guide rod 67 longitudinally of the vehicle between two stops 68 and 69. Coil springs 71 bias the mass to a central position as shown and the mass is preferably insulated from the guide rod. The mass carries two contacts 72 and 73 cooperating with resistances 74 and 75. Both of these resistances are in circuit with the rheostat 64, but the resistance 74 controls the receiver 22 and the resistance 75 controls the transmitter 38.

The circuit for the transmitter is from battery 76 over wire 77 to section 65 of the inertia mass, resistance 75, wire 78, section A of rheostat 64, rheostat arm 81 to ground 82, and then through lamp 62 back to the battery. Movement of the mass varies the resistance 75. Centrifugal device 63 actuates a rod 85 in guides 86 to move rheostat arm 81 through rack 84 and gear 83 to vary the amount of resistance in circuit with the lamp 62 and also with the receiver 22. Increase in speed moves rod 85 to the left against the bias of spring 88. Decrease in speed moves rod 85 to the right.

The circuit for the receiver 22 includes battery 89, section 65a of the mass, contact 72, resistance 74, wire 79, section B of rheostat 64, to ground, and then through the receiver and back to the battery.

The operation of the circuits of Fig. 6 is as follows: When the vehicle suddenly starts from rest with the transmitter 38 at maximum intensity and receiver 22 at minimum sensitivity, the device 63 acts to rotate rheostat arm 81 to the right to increase A and decrease B. The inertia mass moves to the left at once before device 63 is effective, hence resistance 75 increases to dim lamp 62. Resistance 74 decreases to increase sensitivity of 22 before arm 81 moves to right to decrease B for the same purpose. When acceleration ceases, the mass assumes fixed position shown and centrifugal device 63 acts to control simultaneously both 22 and 38 through A and B. As vehicle speed increases, B decreases to increase sensitivity of 22, and A increases to decrease effectiveness of 38. Decrease in vehicle speed reduces A and increases B.

When the vehicle decelerates the inertia mass moves to the right to increase 74 to decrease sensitivity of 22 while action of 63 tends to increase B for the same purpose. Movement of contact 73 to the right decreases 75 to brighten 62 as action of 63 tends to decrease A for the same purpose. When the vehicle stops, 22 assumes normal value for which it is set and 62 assumes highest effectiveness with A at lowest value.

It will thus be seen that the receiving and transmitting devices may be designed for automatic response to changing conditions. The normal sensitivity of receiving device 22 may be arranged to permit a vehicle to park a predetermined distance behind a leading vehicle but not to go closer. The control may also be arranged to prevent too sudden movement of the following vehicle toward parking position, but to permit such movement at a predetermined safe or reasonable speed.

The centrifugal device 63 may be driven from the speedometer cable of an automotive vehicle, or from some other part of the vehicle which always moves at a fixed rate with respect to the rate of vehicle movement. That is, the device should always operate at a speed which is directly proportional to the speed of the vehicle.

The principles underlying the automatic control of vehicles in accordance with their speeds or changes in speed may be expressed mathematically as follows:

(1) $i = I_1 - f(V_1) + f(d_1)$ or (2) $i = I_1 - f(V_1) - f(a_1)$

Figures 1, 2, 7:
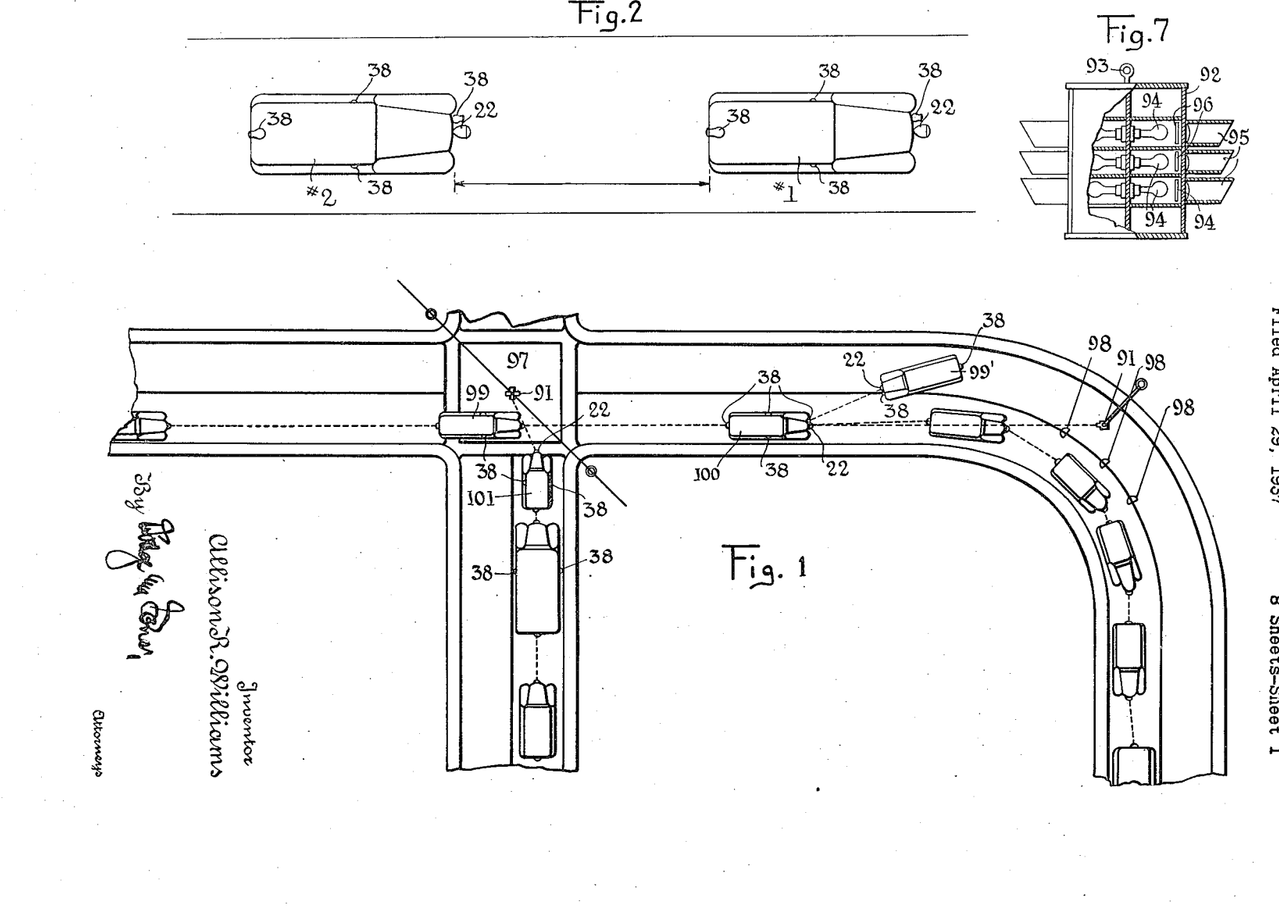
Figure 1 is a diagrammatic plan view of a highway intersected by a cross road, said highway possessing a sharp turn, and with vehicles moving along said highway.
Fig. 2 is a diagrammatic view illustrating the principles underlying the invention as it is applied to automotive vehicle control.
Fig. 7 is a view in elevation of a main control device or control energy transmitter designed for highway use, with parts broken away to show the interior construction.

In the above equations the functions are as follows:

$i$ = the instantaneous value of the control energy emitted by the transmitter of car #1 indicated in Fig. 2.

$I_1$ = the constant normal intensity of the control energy emitted when car #1 is at rest.

$V_1$ = instantaneous velocity of car #1.

$d_1$ = instantaneous deceleration of car #1; and $a_1$ = instantaneous acceleration of car #1.

Thus, for example, if $I_1$ has a value of 100, and $f(V_1)$ has a value of 50 when car #1 is traveling at a speed of seventy miles an hour, and $f(d_1)$ equals 70 when $d_1$ is a maximum (100 ft./sec.$^2$), the value of $i$ expressed by Equation 1 is $$i = 100 - 50 + 70$$

Therefore $$i = 120$$

If the receiver on car #2 has a sensitivity of $s_2$ under the above conditions, it may be represented by the equations:

(3) $s_2 = S_2 + f(V_2) - f(d_2)$ or (4) $s_2 = S_2 + f(V_2) + f(a_2)$ where $S_2$ = normal constant sensitivity when car is at rest.

$V_2$ = instantaneous velocity of car #2.

$d_2$ = instantaneous deceleration of car #2.

$a_2$ = instantaneous acceleration of car #2.

If $S_2$ has a value of 25 and $f(V_2)$ at seventy miles an hour has a value of 50 and both $f(d_2)$ and $f(a_2)$ have zero values because the car has a constant velocity, then from either Equation 3 or 4

$$s_2 = 25 + 50$$

or $$s_2 = 75$$

If, under the above conditions, $f(a_2)$ has a value of 35, then from Equation 4

$$s_2 = 25 + 50 + 35$$
$$s_2 = 110$$

However, if car #1 is at rest $i_1 = I_1 = 100$. If then car #2 is proceeding slowly and $f(V_2) = 20$ with the value of $f(d_2)$ at 35 then from Equation 3

$$s_2 = 25 + 20 - 35$$
$$s_2 = 10$$

It will be clear from the above mathematical exposition that the method herein described is of general application to meet an endless variety of conditions, and that the factors involved may be computed accurately. It is to be understood that the figures chosen in the equations are for purposes of illustration only, and hence arbitrary values are assumed for the various mathematical functions expressed.

The structure just described consists of a single receiver 22 on the front of the vehicle and a single transmitter 38 on the rear of the vehicle, with the receiver so arranged as to be responsive to control energy emanating from a vehicle ahead of the one under control. When it is found desirable to exercise control of the vehicles to prevent them turning out of line while going around a curve or under similar conditions in which a stationary control energy station is placed along the right of way, the vehicle may carry suitable receiving devices mounted on the undercarriage of the vehicle. These receivers may be of a construction similar to the receiver 22 and differing therefrom only in location on the vehicle. These receivers may control the circuits of the braking mechanism of Fig. 3 so as to prevent vehicles from creating a dangerous condition. As shown in Fig. 1, 91 represents a stationary control energy transmitter placed along the right of way at the curve. When a vehicle moving from left to right attempts to pass another at the curve, control energy from device 91 strikes the receiver of the offending car and causes the car brakes to be applied. The mechanism may be so designed that after a predetermined interval the car brakes may be released and the car permitted to advance provided that no further attempt is made to turn out of line at the curve.

It may, as suggested above, be desirable in some instances to locate the stationary source of control energy along the right of way either by suspension above the roadway or in a chamber beneath the roadway. When the device is to be suspended above the roadway, it may take the form indicated in Fig. 7 where 92 is a housing suspended by a ring bolt 93. Carried within the housing are a plurality of polarized light transmitters 94 arranged to project rays of polarized light through reflecting hoods 95. Polarizing screens 96 will, of course, be interposed between the hoods and the lamps as before.

The application of a device of this kind to traffic control has just been described in connection with Fig. 1 of the drawings, where the transmitter 91 is suspended above the highway at a curve. A similar device, located at the cross-roads 97, may be utilized similarly.

If a vehicle such as 99 and equipped with a control receiver, enters the intersection 97 from the main highway at a high rate of speed at the same time that another vehicle 101, going at a similar rate of speed, approaches the intersection, the rays of light from the transmitter 91 will strike the receiver of the vehicle 101 and apply the brakes before a collision can occur. It will be understood that exercise of control on vehicles approaching the intersection under other circumstances causing an unsafe condition, will be controlled in a similar manner so that specific description will not be necessary.

The control of vehicles at the curve may be carried out in various ways according to the dangerous conditions which may arise. For example, the line of separation for the two lines of traffic may be protected by polarized light transmitters 98 buried in the pavement beneath the surface of the road and designed to transmit light to receiving devices on the front of vehicles approaching the curve. These light rays may exercise control either by applying the brakes on the vehicle, or in a similar manner.

By reference to Figs. 1 and 2 of the drawings, it will be seen that the vehicles illustrated may be equipped with transmitters which are not located at the front and rear of the vehicle. For example in Fig. 1, the vehicle 99 is equipped with transmitters 88 for projecting control energy beams laterally of the vehicle and onto the receivers 22 of vehicles approaching the intersection 97. Similarly the cars shown in Fig. 2 are equipped with lateral transmitters 88 and also with forward transmitters 80, in addition to the front and rear receivers and transmitters. The forward transmitters may so direct their beams as to strike the receivers of cars traveling in the opposite directions in a line to cause a head-on collision. As in Fig. 1, the car 99' equipped with a receiver will be stopped by beams from forward transmitter 88 of car 100, before a head-on collision can occur. Arrangements other than those indicated, may be adopted, those given being for the purpose of illustrating the broad and flexible nature of the system.

Figure 5:
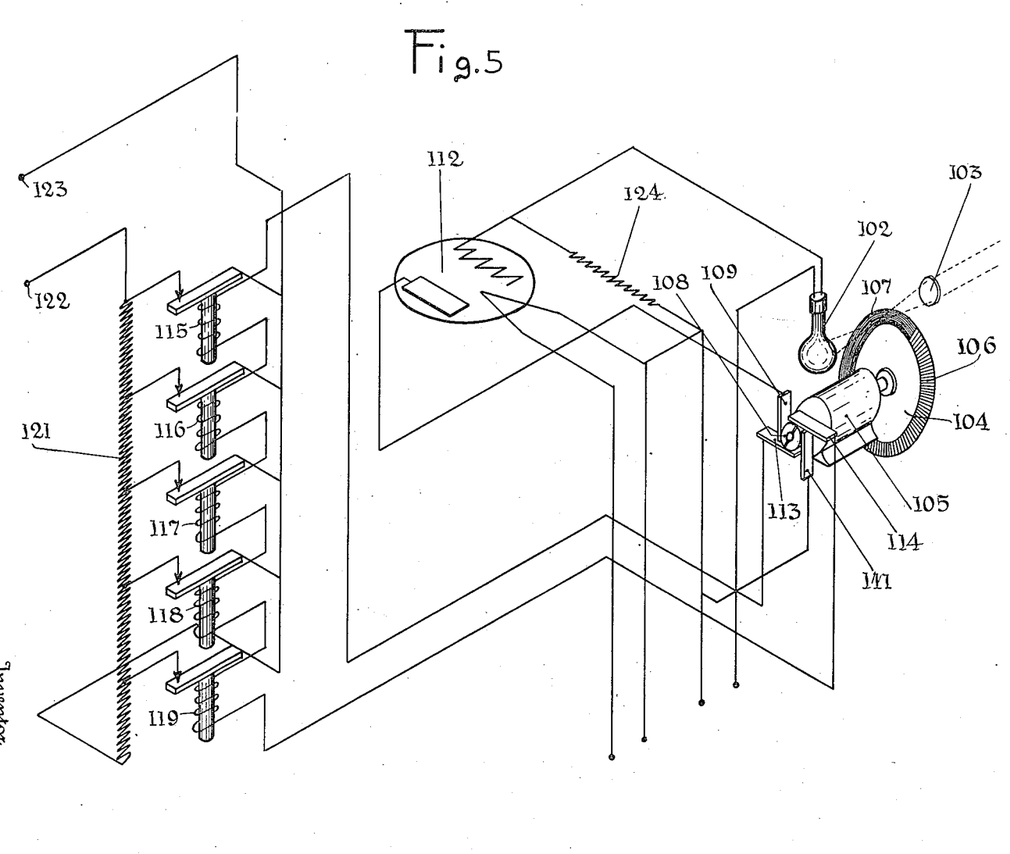
Fig. 5 is a circuit wiring diagram showing a modified form of receiving system for exercising automatic control.

The fundamental operation of systems embodying the present invention has been described, together with means for preventing operation of the vehicle controlling means in case stray light of non-polarized character should fall upon the receiving devices. It will be understood that the mechanisms illustrated are only by way of example and represent types of devices which may be used to carry out the present invention, but without limiting the invention to the details of those mechanisms. For example, Fig. 4 of the drawings shows one form of receiving circuit which may be utilized to control the intensity of the light emanated by a transmitter. However, other types of receiving circuit may be utilized and another suitable type of circuit is shown in the diagram of Fig. 5. While in the device of Fig. 4 two photoelectric cells are required to prevent the mechanism from operating in response to energy from an extraneous source, the system of Fig. 5 requires the use of a single photoelectric cell, and the results obtained are similar to those obtained by use of the circuit of Fig. 4.

Referring now to Fig. 5, reference character 102 designates a photoelectric cell adapted to receive rays of polarized light through a condensing lens 103. Interposed between the lens 103 and the photoelectric cell 102 is a glass disc 104 rotatable by a motor 105. The disc 104 is so constructed that one half of it, designated 106, will transmit polarized light radially, whereas the other half 107 will transmit polarized light tangentially. It will thus be seen that plane polarized light vibrating in a radial plane may pass from the lens 103 to the photoelectric cell 102 when the part 106 of the disk is in the light path. When the portion 107 of the disc is in the light path such rays will be blocked out.

Mounted on the shaft of motor 105 at the end remote from the disc 104 is a commutator 108. Cooperating with this commutator are two sets of diametrically related brushes. The brushes 109 and 111 are connected to the plate circuit of a vacuum tube 112, while the other set of brushes 113 and 114 is connected to the series related windings of a bank of split circuit relays 115, 116, 117, 118, and 119. These relays are connected in parallel with a resistance 121 included in the control circuit to which the terminals 122 and 123 are connected. The photoelectric cell 102 is connected in the grid circuit of the tube 112 and a resistance 124 is shunted across that circuit.

The sets of brushes are so related that they short-circuit the solenoids synchronously with the changes in the transmission characteristics of the rotating disc 104. Since the commutator 108 short-circuits the relay solenoids in accordance with the polarizing effect of the disc 104, the control circuit will not be operated when light of a character not desired strikes the rotating disc. If the relays are set to operate in response to receipt of horizontally polarized light, vertically polarized light will be ineffective to actuate them. The resistance 121 associated with the vacuum tube 112 performs the same function as the resistance 49 in the circuit of Fig. 4, and it functions to cut-in the control resistance 121 by steps and in proper succession so that the controlled mechanism responds proportionally to the intensity of polarized light picked up by the photoelectric cell 102.

In the foregoing description it has been assumed that the control energy is in the form of polarized light, and that the transmitters and receivers are designed to operate in connection with plane polarized light. It has been indicated that control may be exercised in response to wave motion in the form of supersonic sound and in order to make the application more clear there is shown in Figs. 10 and 11 mechanism for both transmitting and receiving supersonic vibrations for effecting control in a manner similar to that already described.

Figure 10:
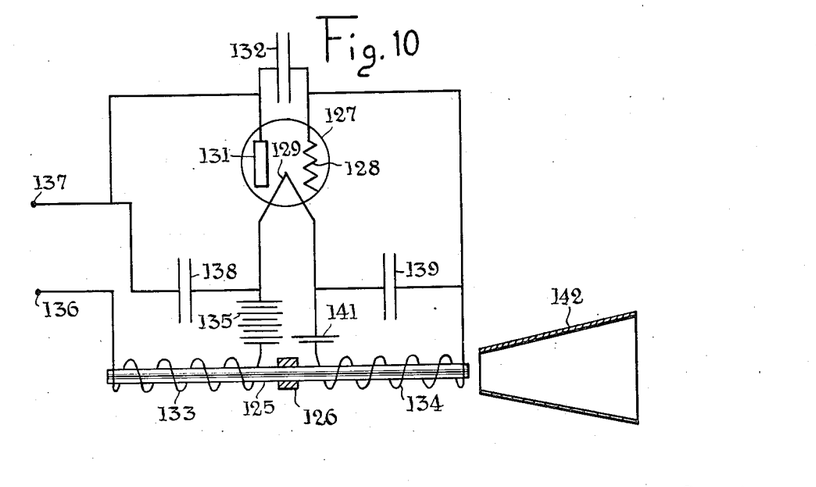
Fig. 10 is a circuit wiring diagram of a typical superaudible sound transmitter of the magnetostriction type which may be utilized as a means of supplying control energy.

The sound transmitting apparatus shown in Fig. 10 consists of a rod 125 of Monel metal or other material susceptible to the magneto-striction phenomenon, and whose length is equal to one-half the wave length of the sound to be transmitted. This rod is mounted rigidly in a suitable support 126 and forms a coupling link between the plate and grid circuits in the oscillatory system of vacuum tube 127. As here shown, the oscillatory system of the thermionic or vacuum tube 127 is of usual form. The tube 127 contains a grid 128, a filament 129, and a plate 131. A capacity 132 is connected between the plate and grid for resonating the total reactance of windings 133, 134 to the natural frequency of the rod 125. The potential between the plate and grid is applied by a battery 135, or other source of power. This battery is connected between one terminal of the filament and one end of the inductor winding 133, the other end of this winding being connected to an input terminal 136. The plate 131 is connected to the other input terminal 137 and a capacity 138 is shunted across from terminal 137 to the filament 129. Inductor winding 134 connects the grid 128 with the filament 129 and is shunted by a condenser 139. A low potential source 141 is connected between one end of winding 134 and the filament 129 in opposition to the source of potential 135.

The oscillatory circuit of tube 127 is tuned to the frequency to be transmitted. When this tube oscillates the electromagnetic effects produced in the rod 125 cause it to undergo periodic distortion longitudinally and this sets up a high intensity, high concentration beam of supersonic sound waves which pass out of the directing horn 142. The frequency of these sound waves may be in the neighborhood of 25,000 cycles per second, as this range is above the range of audibility to the human ear and may be produced readily by apparatus now commercially available. It will be understood that the magneto-striction device illustrated in Fig. 10 may be substituted for any of the transmitters heretofore described, provided that the receivers are constructed and arranged to respond to supersonic vibrations rather than to polarized light vibrations.

Figure 11:
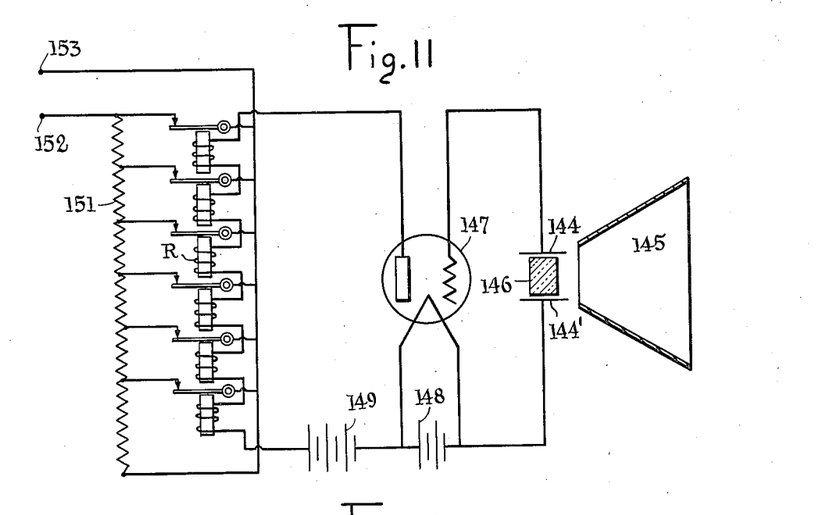
Fig. 11 is a circuit wiring diagram of a typical receiving or pick-up device for receiving the superaudible sound impulses sent out by a transmitter of the type shown in Fig. 10.

One form of apparatus suitable for receiving supersonic vibrations is illustrated in Fig. 11 of the drawings. This receiver as shown comprises two pick-up microphones 144, 144', a sound concentrating cone 145 and a piezo-electric crystal 146. This crystal is capable of vibrating in accordance with the intensity of the sound waves striking it, and it may be used to transmit those waves to an electric circuit associated with a vacuum tube. The piezo-electric crystal may consist of quartz, Rochelle salts or tourmaline, all of which have piezo-electric properties and any other similar crystals having the desired characteristics. As shown, the piezo-electric crystal is shunted across the grid circuit of a vacuum tube 147 so as to produce in the plate circuit of that tube currents for operating a bank of relays similar in character to those illustrated in Figs. 4 and 5. The filament battery is designated 148, the plate battery 149, and the relay bank generally by the reference character R. The relay bank determines the amount of the resistance 151 that is included in circuit with the terminals 152 and 153. These terminals lead to the control mechanism of the vehicle, one example of which is the valve 25 of Fig. 3. When the piezo-electric crystal is set in vibration, its vibration is proportional to the intensity of the sound waves received, and the effect is transmitted into the plate circuit of the vacuum tube to actuate the relays in proper rotation, and thereby effect control of the vehicle.

Aircraft control

Figure 12:
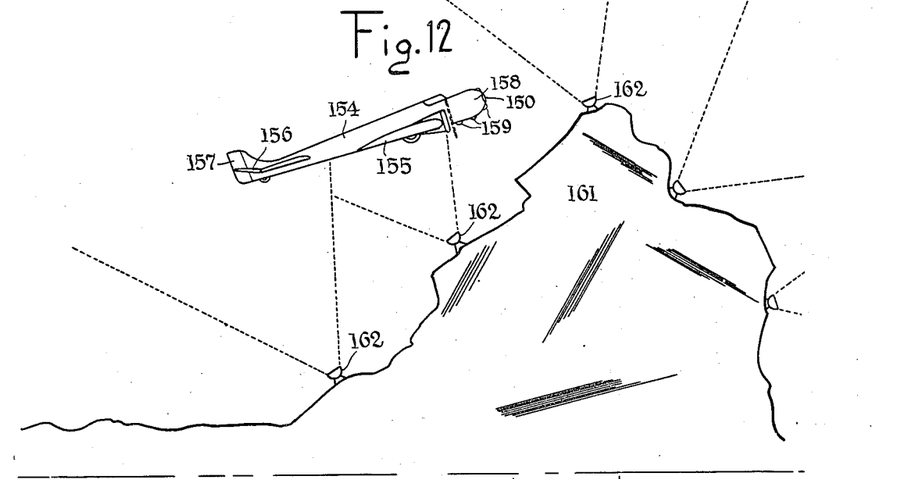
Fig. 12 is a diagrammatic view, showing a control system embodying the present invention installed on an aircraft.

It has been indicated above that this invention may find application for the control of aircraft and more particularly to prevent collision between aircraft and stationary objects along the line of flight, or between two craft in flight. An application of the invention to aircraft is illustrated in Fig. 12 of the drawings. Reference character 154 designates the fuselage of an air liner having wings 155 and having the usual control surfaces including elevators 156, and a rudder 157. The nose of the fuselage designated by reference character 158 has disposed about it at the side, bottom and front, a plurality of control energy receivers 159. These receivers may be connected by suitable apparatus, such as that illustrated in Fig. 4 of the drawings, to actuate mechanism for operating the elevators 156 whenever the air liner, under poor conditions of visibility, approaches too close to an obstacle with which it may collide, or in dangerous proximity to a similar craft equipped with a control energy transmitter. An obstacle may comprise a mountain designated 161, along the slopes and on the top of which are provided control energy transmitters 162 having a spread of beam sufficient to protect a safe area adjacent the normal line of flight of aircraft in the vicinity of the mountain. In Fig. 12, 160 designates a control energy transmitter.

In this way, should the air liner approach the mountain under foggy conditions or at night and the pilot be unaware of the proximity of the mountain, the control energy beams from transmitters 162 would strike the receivers 159 and actuate the elevators 156 automatically and sufficiently to deflect the craft away from the mountain, and thus avoid a disaster. It will be understood that the control of the elevators may be suitably coordinated with the lateral stabilizing ailerons. Also the control may be exerted on the rudder 157 as well as upon the elevators and lateral stabilizers. For example, if the obstacle in the line of flight is a pole or tower, it would be simpler to cause a lateral deflection of the craft than to elevate it to clear the obstacle. In operating the elevators automatically to clear an obstruction, it would, of course, be essential to safety that the craft not be directed upwardly at too steep an angle to clear the obstacle, that is, not be deflected sharply enough to exceed the stalling angle.

The arrangement may be such that if control energy strikes the receiver in the center of the nose of the plane, the elevators will be raised to cause the plane to rise. If the control energy strikes either the right or the left hand side receivers, the arrangement may be such as to move the rudder and the ailerons to turn the craft in a horizontal plane and thus avoid an obstruction, or another craft. It will be understood that when the present invention is applied to aircraft, the controls will always be connected to the various control surfaces of the plane, rather than to a brake, clutch or the like, as on land vehicles.

Figure 14:
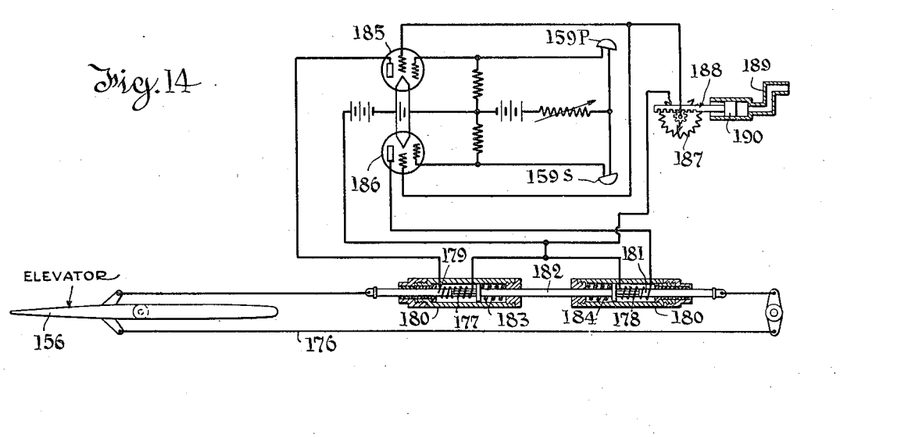
Fig. 14 is a diagrammatic view showing the control circuits for the elevators of an aircraft indicated in Fig. 12.
Figure 15:
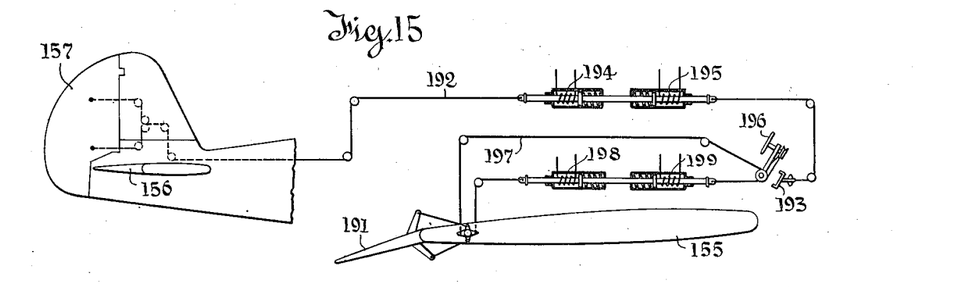
Fig. 15 is a similar view of the control circuits for the rudder and ailerons of the craft of Fig. 12.

Fig. 14 shows a simple illustration of how the automatic control circuits of the invention may be arranged to control the elevators of an aircraft such as that shown in Fig. 12. Fig. 15 indicates how the rudder and ailerons may be controlled.

In Fig. 14 the elevator 156 operated by the usual cable connection 176 may be moved in one direction or the other by electromagnetic means in the form of opposed solenoid windings 177 and 178 acting on cores 179 and 181. These cores are connected by a rod 182 forming a part of the cable connection 176. Each winding acts in opposition to an opposing spring and these springs 183 and 184 bias the elevator to central position. The windings, cores and opposing springs are enclosed in housings 180.

The solenoid windings are included in the output circuits of tubes 185 and 186. These tubes are controlled by energy picked up by photo cells 159S and 159P. The plate currents of the tubes will, therefore, be proportional to the intensity of the energy received from the source. The sensitivity of the tubes is made proportional to the speed of the craft by a rheostat 187. This rheostat is controlled through a rack and pinion 188 and piston 190 responsive to the usual air speed control Pitot tube 189 of the craft to affect control of the screen grid circuits of the tubes 185 and 186 as shown. The sensitivity of the tubes is thus made proportional to the air speed of the craft.

Since the circuits employed are similar to those already described in connection with Fig. 4, detailed explanation is believed to be unnecessary. Control will be exercised by whichever cell receives the current of greater intensity, that is, whether the intensity of energy received is greater at the top or at the bottom of the plate. The plate current of the tube which takes control is roughly proportional to the intensity of the energy received from the source, and the effect of this current is to actuate the solenoid cores 179 and 181 to move the elevators 156 in response to receipt of control energy.

In this disclosure elementary circuits only are shown, and it is to be understood that in practice any required number of stages of amplification will be used in order to operate the solenoids properly.

The control mechanism for the rudder 157 and ailerons 191, using mechanism such as is illustrated diagrammatically in Fig. 15 will now be described. The rudder 157 includes in its control cable 192, normally actuated by foot pedal 193, a pair of opposed solenoid windings 194 and 195 arranged as already described in connection with Fig. 14. The windings will be responsive to control energy received by photo cells arranged as already described but on the sides of the plane. The ailerons 191 normally controlled by hand wheel 196, include in their cable connection 197 another pair of opposed windings 198 and 199, also arranged as pointed out in detail in Fig. 14 and operating similarly.

It will thus be understood without further explanation that by suitably arranging the receivers or photo cells the automatic control means may be applied to the elevators, rudder and ailerons of aircraft and all of them properly coordinated.

Marine craft

Figure 13:
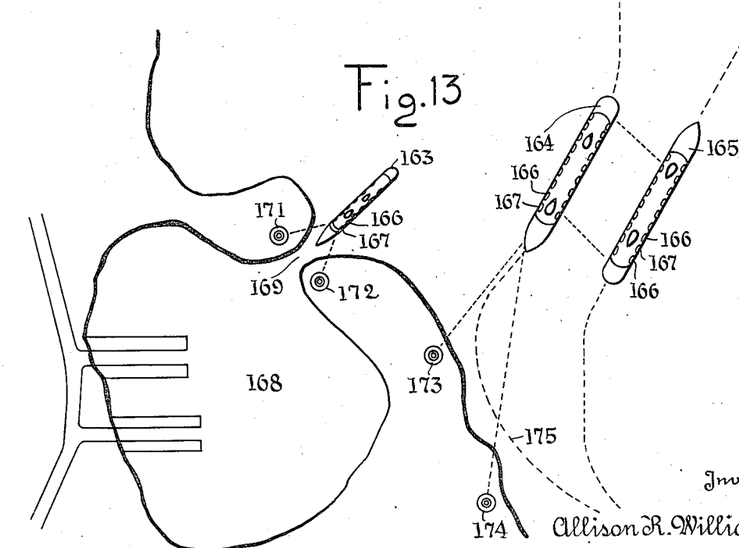
Fig. 13 is a diagrammatic view of a control system embodying the invention applied to marine craft.

An example of the application of this invention to marine craft is illustrated in Fig. 13 of the drawings, wherein reference characters 163, 164 and 165 designate three separate marine craft. The sides of the craft carry a plurality of spaced alternately disposed transmitters 166 and receivers 167 suitably connected to the steering mechanism of the vessels in accordance with the principles already described for land vehicles. Should the two craft approach each other in a fog, the control beams from the transmitters on both craft would strike the receivers on the other craft and cause both of said craft to be deflected or stopped to avoid a collision. Obviously the receiving mechanism could be made to control the rudder or the engines or both. As in the case of land vehicles the range of effectiveness of the transmitters can be determined by the rate of movement of the craft to provide for maximum safety under all conditions.

The principle is likewise applicable to protecting vessels from collision with the shore. If the craft 163 should desire to enter the harbor 168 through a narrow entrance 169, the land adjacent this entrance might be provided with two stationary transmitters 171 and 172, throwing beams of control energy across the entrance 169. Receivers 167 located on the vessel would be struck by the beams from transmitters and the steering mechanism actuated to cause it to pass safely through the entrance, even though such entrance might be obscured by fog or mist. When applied to marine craft, this invention contemplates the use of any of the forms of control energy referred to above, by polarized light, supersonic sound control signals, infra-red rays or the like. It will be found desirable in the harbor entrance arrangement just described, to so arrange the structure on the craft that the rudder mechanism will be deflected to starboard when a beam strikes it on the port side and vice versa.

The system as applied to marine craft may also find application to prevent marine craft from striking shoals or grounding under conditions of poor visibility, or because of carelessness, inattention, or lack of skill on the part of the operator. For this purpose the shore may be provided with control energy transmitters 173, 174. When a craft such as 164 approaches too closely the beams from the transmitters 173 and 174 will strike the receivers on the craft and operate the rudder control to deflect the craft as indicated by dotted line 175. Numerous other arrangements will be suggested by the foregoing disclosure. The control energy transmitters and receivers described may find application to all kinds of craft without departing from the principles already set forth.

Figure 16:
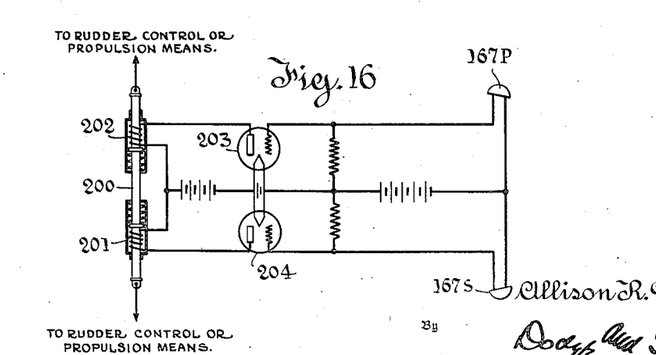
Fig. 16 is a diagram showing the control circuits applied to a marine craft of the type illustrated in Fig. 13.

One example of a working arrangement applicable to marine surface craft as indicated in the above description of Fig. 13, is illustrated in Fig. 16. In Fig. 16 there is shown one form of mechanical set-up for controlling the rudder of a marine craft by means of energy transmitted from an outside source of control, be it stationary or moving and be it on shore or on another marine craft.

The photo cells or receivers 167P and 167S may be located on the port and starboard sides, respectively, of a craft to be controlled (Fig. 13). The receivers are in the input circuit of tubes 203 and 204 arranged as in Fig. 4. The output circuits of the tubes include, respectively, opposed windings 201 and 202 acting on cores connected by rod 200. This rod may be arranged in any suitable manner to control the rudder of the craft or the propulsion means or both as already indicated. It will be understood that the response of windings 201 and 202 in the output circuits of the tubes will be determined by the intensity of the energy received by the photo cells. The direction of response will, of course, be determined by which one of the photo cells receives the control energy.

It has been indicated in connection with the diagram of Fig. 1, how a vehicle control may be made effective to prevent vehicles from passing one another on a curve. The scheme there illustrated requires response of the vehicle receiver to a control energy beam from a stationary transmitter. Vehicle carried control means for this purpose is disclosed and claimed in my copending application, Serial No. 180,443, filed December 17, 1937, now Patent No. 2,152,123, March 28, 1939.

It is to be understood that while specific applications of this invention have been described in the foregoing specification, these are not to be construed as limitations but only to indicate the broad scope of the underlying inventive concept here involved. While various schemes have heretofore been suggested for automatic control of vehicles, this invention contemplates refinements and simplifications which adapt the invention to practical use in connection with automotive vehicles, rail vehicles, aircraft or marine craft, to make for safety of operation under all conditions, and in spite of inattention or other failure on the part of a vehicle or craft operator to make timely response to a dangerous condition. Accordingly, it is desired that the claims be given the broadest possible interpretation commensurate with the state of the art.

What is claimed is:

1. The combination with a dirigible vehicle, of a source of polarized light for projecting its beam outwardly from said vehicle; and means responsive to changes in the rate of movement of the vehicle for varying the character of the light transmitted by said light source.

2. The combination with a dirigible vehicle, of a wave-motion sensitive device and a wave motion transmitting device carried by said vehicle; a braking system on said vehicle; means associated with said wave-motion sensitive device for operating the braking system on the vehicle in response to receipt of wave-motion vibrations of predetermined character and means on said vehicle for varying the character of the wave-motion transmitted from that vehicle in accordance with the rate of movement of the said vehicle.

3. In an automatic system of vehicle control, a dirigible vehicle; an energy receiving means on said vehicle for controlling the decelerating movements of said vehicle; and inertia controlled means for varying the sensitiveness of said means.

4. In an automatic system of vehicle control, a vehicle; wave-motion energy receiving means on said behicle for controlling the decelerating movements of said vehicle; and means responsive to variations in the speed of said vehicle for varying the sensitiveness of said means.

5. In an automatic system of vehicle control, an automotive vehicle; a source of control energy on said vehicle; and automatic means for increasing the effectiveness of energy transmitted by said source in accordance wih the deceleration rate of said vehicle, and decreasing the effectiveness of said energy in accordance with the acceleration rate of said vehicle.

6. An automatic vehicle control system comprising a plurality of vehicles in substantial longitudinal alignment; a control energy transmitting means carried on the leading vehicle in position to direct its beam rearwardly of the vehicle; a control energy receiving means carried on the following vehicle in position to receive energy from the transmitting means of the leading vehicle; means for controlling the movements of said following vehicle in response to receipt of energy by said receiving means; means on the leading vehicle for varying the effectiveness of the control energy transmitting means in accordance with the character of the movement of said leading vehicle; and means on the following vehicle for varying the sensitiveness of the receiving means on said vehicle in accordance with the character of the movement of said following vehicle.

7. An automatic vehicle control system comprising a plurality of vehicles; an energy transmitting means disposed on the leading vehicle so as to direct its beam rearwardly thereof; an energy receiving means disposed on the following vehicle in position to receive energy from the transmitting means of the leading vehicle; means on said following vehicle for controlling movements of said following vehicle in response to receipt of energy by said energy receiving means; and means responsive to the speed of said following vehicle for varying the sensitiveness of the receiving means on said following vehicle.

8. An automatic vehicle control system comprising a plurality of vehicles in substantial longitudinal alignment; a control energy transmitter carried on the leading vehicle to direct its beam toward the following vehicle; a control energy receiver on said following vehicle to receive energy from the transmitter of the leading vehicle; means for controlling the movements of said following vehicle in response to receipt of energy by said receiving means; and means responsive to the speed of movement of said leading vehicle for varying the effectiveness of the transmitter on said leading vehicle.

9. An automatic vehicle control system comprising a plurality of dirigible vehicles subject to individual control along routes determined by the will of the operator; polarized light transmitting means carried by each of said vehicles; polarized light responsive means carried by each vehicle; and means for controlling the decelerating movements of each of said vehicles in response to receipt of polarized light by said polarized light responsive means.

10. An automatic vehicle control system comprising a plurality of dirigible vehicles subject to individual control along routes determined by the will of the operator; supersonic sound vibration transmitting means carried by each of said vehicles; supersonic sound responsive means carried by each of said vehicles; and means for controlling the decelerating movements of each of said vehicles in response to receipt of supersonic vibrations by the responsive means on said vehicle.

11. In an automatic vehicle control system a vehicle subject to directional control along routes determined by the will of the operator; wave-motion control energy receiving means on said vehicle; means for controlling decelerating movement of said vehicle in response to receipt of wave-motion control energy of selected character by said receiving means; and means for preventing operation of said controlling means by any control energy other than that of the character selected.

12. In an automatic vehicle control system, a plurality of dirigible vehicles in substantially longitudinal alignment; a wave-motion control energy transmitter on the forward vehicle and arranged to direct its energy rearwardly onto the following vehicle; a wave-motion control energy receiver on the following vehicle and arranged to receive energy from the transmitter of the leading vehicle; and means responsive to control energy received on said following vehicle for limiting forward movement of said following vehicle with respect to said leading vehicle.

13. In an automatic vehicle control system, a plurality of dirigible vehicles in substantially longitudinal alignment; a wave-motion control energy transmitter on the forward vehicle and arranged to direct its energy rearwardly onto the following vehicle; a wave-motion control energy receiver on the following vehicle and arranged to receive energy from the transmitter of the leading vehicle; and speed responsive means on said following vehicle for limiting the forward movement of said following vehicle with respect to said leading vehicle.

14. An automatic vehicle control system comprising a plurality of vehicles; an energy beam transmitting means disposed on one vehicle so as to direct its beam outwardly therefrom; an energy beam receiving means disposed on another vehicle in position to receive energy from the transmitting means of the one vehicle; means on said other vehicle for controlling movement of said other vehicle in response to receipt of energy by said energy receiving means; and means on said other vehicle for varying the sensitiveness of the receiving means in accordance with the character of the movement of said other vehicle.

15. An automatic vehicle traffic control system comprising a plurality of vehicles; a control energy transmitting means carried on one of said vehicles in position to direct its beam outwardly of the vehicle; a control energy receiving means carried on another vehicle in position to receive energy from the transmitting means of the first vehicle; and means for controlling movements of said other vehicle in response to receipt of energy by said receiving means.

16. An automatic vehicle control system comprising a plurality of vehicles; an energy transmitting means disposed on one of said vehicles so as to direct its beam outwardly therefrom; an energy receiving means disposed on another vehicle in position to receive energy from the transmitting means of said one vehicle; means on said other vehicle for controlling movements of said other vehicle in response to receipt of energy by said energy receiving means; and inertia controlled means for varying the sensitiveness of the receiving means on said other vehicle.

17. An automatic vehicle control system comprising a plurality of vehicles; a control energy transmitter carried on one of said vehicles to direct its beam toward another vehicle; a control energy receiver on said other vehicle to receive energy from the transmitter of said one vehicle; means for controlling the movements of said other vehicle in response to receipt of energy by said receiving means; and inertia controlled means for varying the effectiveness of the transmitter on said one vehicle.

18. A traffic controlling system for dirigible vehicles comprising a first vehicle having a source of wave motion control energy thereon; means for directing a beam of control energy from said source; means responsive to variations in the character of the movement of said first vehicle for modifying the character of the energy transmitted by said source; a second vehicle having a wave motion energy responsive means thereon; means for varying the sensitiveness of said responsive means in accordance with the character of the movement of said second vehicle; and means on said second vehicle for controlling the decelerating movements of said vehicle in response to receipt of energy from said source.

19. In a dirigible vehicle for use in an automatic vehicle control system, a wave motion control energy transmitting means on said vehicle; a wave motion control energy receiving means on said vehicle; means responsive to receipt of energy by said receiving means for controlling the movements of said vehicle; and means responsive to changes in the rate of movement of said vehicle for simultaneously varying the character of the energy transmitted by said transmitting means and varying the sensitiveness of said receiving means.

20. A traffic controlling system for dirigible vehicles comprising a first vehicle having a source of wave motion control energy thereon; means for directing a beam of control energy from said source; means responsive to variations in the acceleration of said first vehicle for modifying the character of the energy transmitted by said source; a second vehicle having a wave motion energy responsive means thereon; means responsive to variations in the acceleration of the second vehicle for varying the sensitiveness of said wave motion energy responsive means; and means on said second vehicle for controlling the decelerating movements of said vehicle in response to receipt of energy from said source.

21. A traffic controlling system for dirigible vehicles comprising a first vehicle having a source of wave motion control energy thereon; means for directing a beam of control energy from said source; means responsive to variations in the deceleration of said first vehicle for modifying the character of the energy transmitted by said source; a second vehicle having a wave motion energy responsive means thereon; means responsive to variations in the deceleration of the second vehicle for varying the sensitiveness of said wave motion energy responsive means; and means on said second vehicle for controlling the decelerating movements of said vehicle in response to receipt of energy from said source.

22. The combination with an automotive vehicle, of a source of wave motion control energy for projecting a control beam outwardly from said vehicle; and means responsive to changes in the rate of movement of said vehicle for varying the character of the energy transmitted by said source.

23. In an automatic automotive vehicle control system an automotive vehicle; polarized light responsive means on said vehicle, said polarized light responsive means comprising two receivers responsive to light polarized in different planes; and means responsive to energy received from one only of said receivers for controlling the decelerating movements of said vehicle.

24. A traffic control system for a plurality of dirigible vehicles, each of said vehicles being capable of individual control over an uncharted route and having a wave motion energy responsive means thereon; a source of wave motion control energy generated at a source external to the vehicles to be controlled; and means on said vehicles under the control of said responsive means for individually controlling the deceleration of said vehicles in response to receipt on said vehicles of control energy from said source.

25. An automatic control system for aircraft for preventing collisions between one craft and another or between a craft and a fixed object, each craft being capable of individual control and having a wave motion energy responsive means thereon; a source of wave motion control energy external to the craft to be controlled and located in protective relation to another craft or object with which the craft to be controlled might collide; and means on said one craft under the control of said responsive means for automatically and individually controlling the direction of flight of said craft away from said source in response to receipt on said craft of control energy from said source.

26. An automatic control system for dirigible vehicles wherein each vehicle is capable of individual control and carries a wave motion energy responsive means thereon; a source of wave motion control energy external to the vehicle to be controlled and located in protective relation to another vehicle or object with which the vehicle to be controlled might collide; and means on said vehicle under the control of said responsive means for automatically directing movement of said vehicle away from said source upon receipt from said source of control energy of predetermined character.

27. That method of automatic traffic control of dirigible vehicles operating on land or water, or in air or water to provide optimum spacing of the vehicles for safety and convenience and giving maximum use of available traffic facilities consistent with safety and convenience, which method comprises controlling the vehicles by control energy received from a source outside of the vehicle to be controlled, and varying the intensity of the control energy in accordance with the velocity and acceleration of the source and the sensitivity of the controlling means on the vehicle to be controlled in accordance with the velocity and acceleration of the vehicle.

ALLISON R. WILLIAMS.